United States Patent
Otsuka et al.

(10) Patent No.: US 10,363,920 B2
(45) Date of Patent: Jul. 30, 2019

(54) HYBRID VEHICLE AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Akira Otsuka, Seto (JP); Takashi Suzuki, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/723,589

(22) Filed: Oct. 3, 2017

(65) Prior Publication Data

US 2018/0099656 A1 Apr. 12, 2018

(30) Foreign Application Priority Data

Oct. 11, 2016 (JP) .................... 2016-199944

(51) Int. Cl.
*B60W 20/16* (2016.01)
*B60W 20/15* (2016.01)
(Continued)

(52) U.S. Cl.
CPC ............ *B60W 20/16* (2016.01); *B60W 10/06* (2013.01); *B60W 10/08* (2013.01); *B60W 20/15* (2016.01);
(Continued)

(58) Field of Classification Search
CPC ...... B60W 20/16; B60W 20/15; B60W 10/06; B60W 10/08; B60W 20/40;
(Continued)

(56) References Cited

U.S. PATENT DOCUMENTS

2006/0218903 A1* 10/2006 Ogata ...................... B60K 6/48
60/295
2007/0204594 A1* 9/2007 Ishii ........................ B60K 6/48
60/274
(Continued)

FOREIGN PATENT DOCUMENTS

JP 2005-330940 A 12/2005
JP 2009-215933 A 9/2009
(Continued)

OTHER PUBLICATIONS

Kobashi et al., WO2014/132443, Sep. 4, 2014 (machine translation).*

*Primary Examiner* — Courtney D Heinle
(74) *Attorney, Agent, or Firm* — Finnegan, Henderson, Farabow, Garrett & Dunner, LLP

(57) ABSTRACT

A hybrid vehicle includes an engine that has a particulate matter filter, a motor, and an electronic control unit. The electronic control unit is configured to control the engine and the motor such that an intermittent operation of the engine is permitted and the hybrid vehicle travels with required power when a vehicle speed is lower than a first predetermined vehicle speed. The electronic control unit is configured to inhibit the intermittent operation of the engine when a deposition amount of particulate matters is equal to or greater than a first deposition amount and a state in which the vehicle speed is equal to or higher than a second predetermined vehicle speed and is lower than the first predetermined vehicle speed is continued for a first predetermined time.

5 Claims, 3 Drawing Sheets

(51) Int. Cl.
*B60W 10/06* (2006.01)
*B60W 10/08* (2006.01)
*B60W 20/40* (2016.01)
*F02D 41/02* (2006.01)
*F02D 41/14* (2006.01)
*F02N 11/08* (2006.01)
*F02D 41/12* (2006.01)

(52) U.S. Cl.
CPC ........... *B60W 20/40* (2013.01); *F02D 41/029* (2013.01); *F02D 41/1475* (2013.01); *F02N 11/0829* (2013.01); *B60W 2510/06* (2013.01); *B60W 2710/06* (2013.01); *B60W 2720/10* (2013.01); *F02D 41/123* (2013.01); *F02D 41/1408* (2013.01); *F02D 2200/0812* (2013.01); *F02D 2200/501* (2013.01); *Y02T 10/48* (2013.01); *Y10S 903/905* (2013.01); *Y10S 903/93* (2013.01)

(58) Field of Classification Search
CPC ......... B60W 2510/06; B60W 2710/06; B60W 2720/10; F02D 41/029; F02D 41/1475; F02D 41/123; F02D 41/1408; F02D 2200/0812; F02D 2200/501; F02N 11/0829; Y10S 903/905; Y10S 903/93; Y02T 10/48
See application file for complete search history.

(56) References Cited

U.S. PATENT DOCUMENTS

| | | | |
|---|---|---|---|
| 2007/0204601 A1* | 9/2007 | Ishii | B60K 6/48 60/295 |
| 2011/0072793 A1* | 3/2011 | Bidner | F01N 3/0233 60/285 |
| 2013/0197735 A1* | 8/2013 | Ueno | B60L 3/12 701/22 |
| 2016/0368483 A1* | 12/2016 | Nawata | B60W 10/06 |
| 2017/0096136 A1* | 4/2017 | Nawata | B60K 6/445 |

FOREIGN PATENT DOCUMENTS

| | | |
|---|---|---|
| JP | 2010-167941 A | 8/2010 |
| JP | 2013-075534 A | 4/2013 |
| JP | 2015-140065 A | 8/2015 |
| JP | 2015-174627 | 10/2015 |

\* cited by examiner

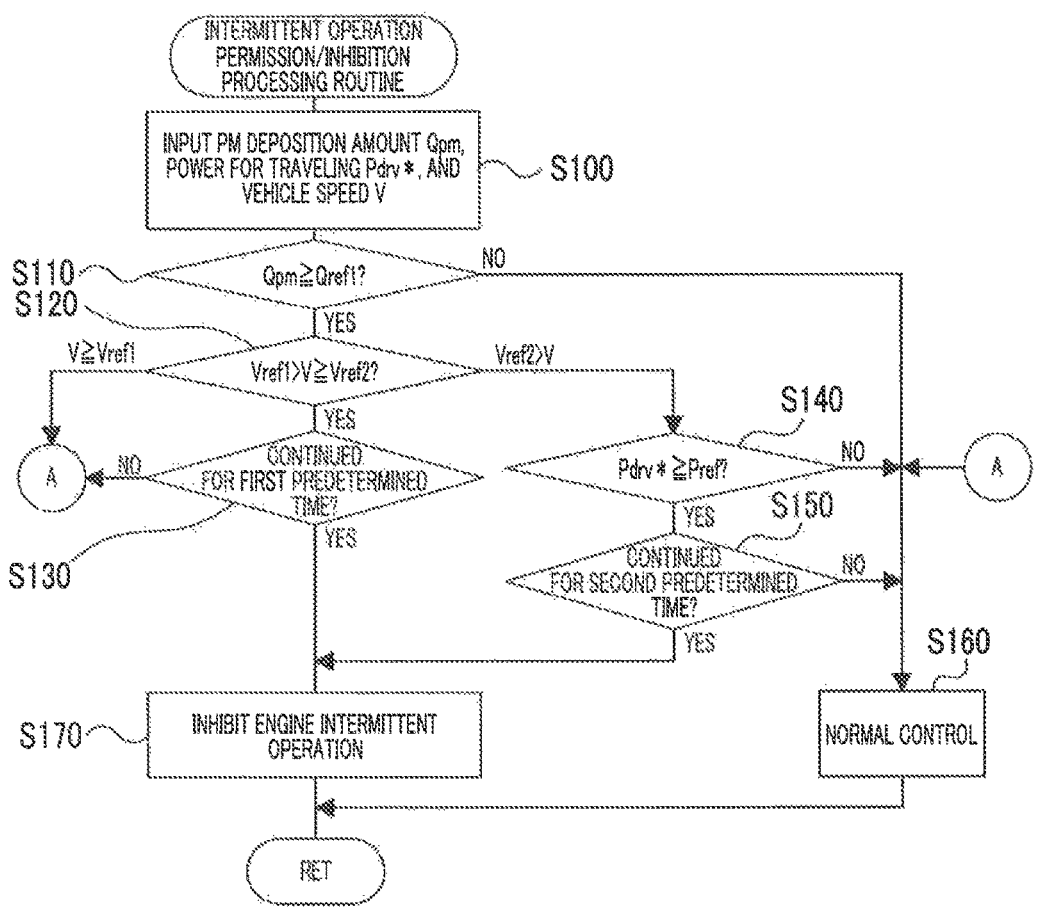

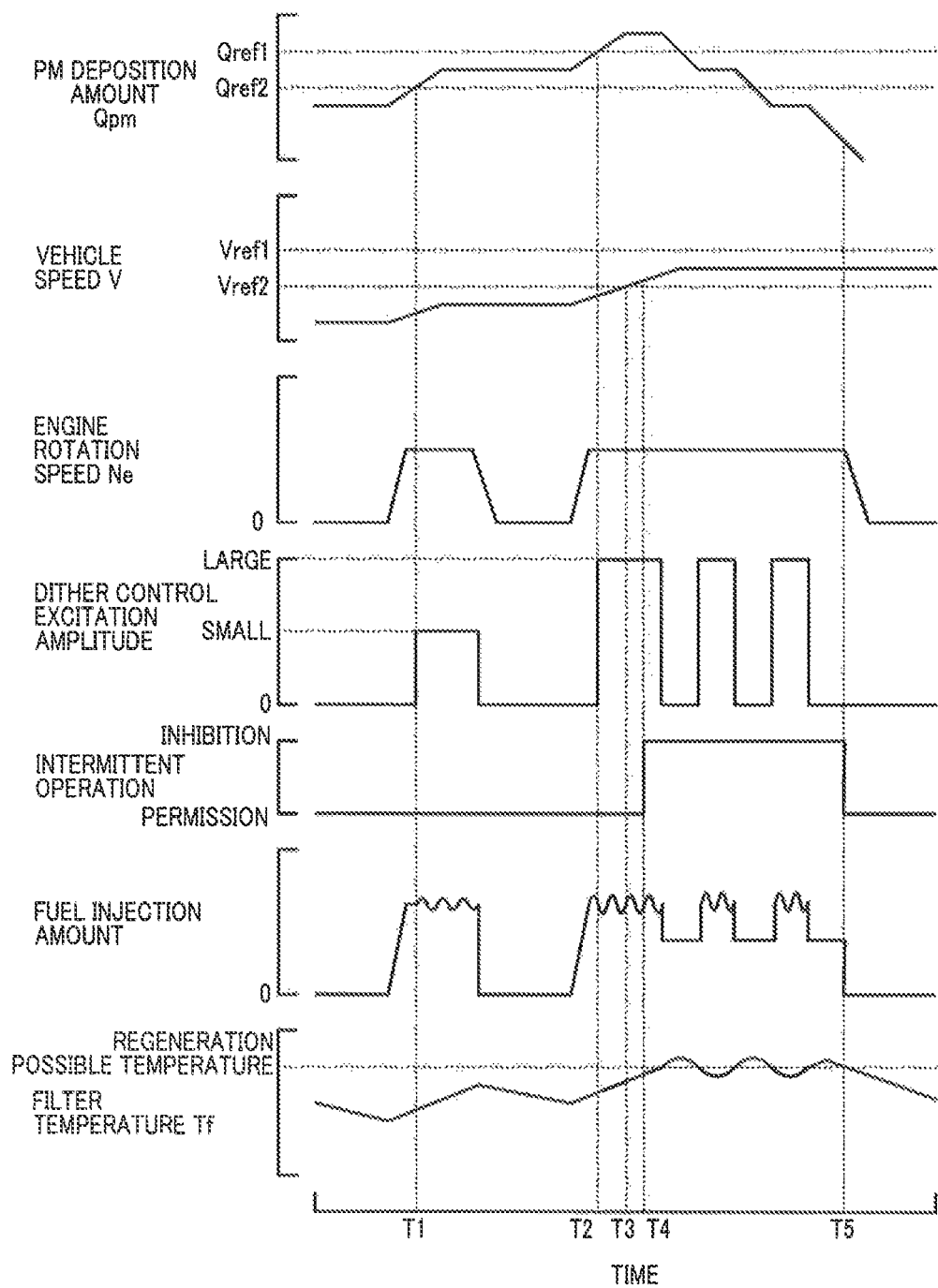

HYBRID VEHICLE AND CONTROL METHOD FOR HYBRID VEHICLE

INCORPORATION BY REFERENCE

The disclosure of Japanese Patent Application No. 2016-199944 filed on Oct. 11, 2016 including the specification, drawings and abstract is incorporated herein by reference in its entirety.

BACKGROUND

1. Technical Field

The present disclosure relates to a hybrid vehicle and a control method for a hybrid vehicle.

2. Description of Related Art

Japanese Unexamined Patent Application Publication No. 2015-174627 (JP 2015-174627 A) discloses a hybrid vehicle in which an engine having a particulate matter elimination filter (hereinafter, a particulate matter filter) configured to eliminate particulate matters in an exhaust system, and the engine and a motor are controlled so as to warm up a battery in a case where a temperature of the battery is lower than a reference value when regeneration control of the particulate matter filter is required. The regeneration control of the particulate matter filter is performed by increasing an output of the engine to increase a temperature of the filter and combusting the particulate matters deposited on the filter. The hybrid vehicle of JP 2015-174627 A makes the temperature of the battery be equal to or higher than the reference value. Thus, a situation in which a discharging electric power upper limit value of the battery decreases due to the temperature of the battery being lower than the reference value, and sufficient electric power cannot be discharged from the battery to prevent the execution of the regeneration control of the particulate matter filter is avoided.

SUMMARY

In a recent hybrid vehicle, an operation area of electrically powered traveling (EV traveling) where an engine is stopped and traveling is enabled with power from a motor exclusively tends to be expanded. In such a hybrid vehicle, even during traveling at comparatively high speed, the engine is intermittently stopped to enable EV traveling. In a case where the engine is intermittently stopped, it may not be possible to sufficiently to increase the temperature of the particulate matter filter attached to the exhaust system of the engine. For this reason, it may not be possible to sufficiently secure an opportunity (regeneration of the filter) for combusting the particulate matters deposited on the particulate matter filter.

The disclosure provides a hybrid vehicle and a control method for a hybrid vehicle which increase opportunities for performing regeneration of a particulate matter filter.

A first aspect of the disclosure provides a hybrid vehicle. The hybrid vehicle includes an engine, a motor, a battery, and an electronic control unit. The engine includes an exhaust system that includes a particulate matter filter. The particulate matter filter is configured to eliminate particulate matters. The motor is configured to output power for traveling of the hybrid vehicle. The battery is configured to exchange electric power with the motor. The electronic control unit is configured to, when the electronic control unit determines that a vehicle speed of the hybrid vehicle is lower than a first predetermined vehicle speed, control the engine and the motor such that an intermittent operation of the engine is permitted and the hybrid vehicle (20) travels with the required power. The electronic control unit is configured to inhibit the intermittent operation of the engine, when the electronic control unit estimates that a deposition amount of particulate matters deposited on the particulate matter filter is equal to or greater than a first deposition amount, and when determination is made that a state in which the vehicle speed is equal to or higher than a second predetermined vehicle speed and is lower than the first predetermined vehicle speed is continued for a first predetermined time. The second predetermined vehicle speed is lower than the first predetermined vehicle speed.

With the above-described configuration, when the electronic control unit estimates that the deposition amount of the particulate matters deposited on the particulate matter filter is equal to or greater than the first deposition amount and a state in which the vehicle speed is equal to or higher than the second predetermined vehicle speed and is lower than the first predetermined vehicle speed is continued for the first predetermined time, the intermittent operation of the engine is inhibited. That is, an operation stop of the engine is inhibited and the operation of the engine is continued. The first deposition amount is a deposition amount to such an extent that determination can be made that regeneration of the particulate matter filter is needed. The first predetermined vehicle speed is a vehicle speed at which the intermittent operation of the engine is permitted when the vehicle speed is lower than the first predetermined vehicle speed, and for example, 110 km/h, 120 km/h, 130 km/h, or the like can be used. For the second predetermined vehicle speed, for example, a vehicle speed that is lower than the first predetermined vehicle speed by about 15 km/h to 30 km/h can be used. The first predetermined time is a time for determining that a state in which the vehicle speed is equal to or higher than the second predetermined vehicle speed lower than the first predetermined vehicle speed for permitting the intermittent operation of the engine is continued over a time or more needed for regenerating the particulate matter filter later, and for example, five seconds, 10 seconds, or the like can be used. From this, in the hybrid vehicle, when determination is made that a state in which the vehicle speed is equal to or higher than the second predetermined vehicle speed lower than the first predetermined vehicle speed for permitting the intermittent operation of the engine is continued over a time or more needed for regenerating the particulate matter filter later, the intermittent operation of the engine is inhibited. With this, it is possible to increase the temperature of the particulate matter filter to increase opportunities for performing the regeneration of the particulate matter filter compared to a case where such control is not performed.

In the hybrid vehicle according, when the electronic control unit estimates that the deposition amount of the particulate matters deposited on the particulate matter filter is equal to or greater than the first deposition amount, and determines that a state in which the vehicle speed is lower than the second predetermined vehicle speed and the required power is equal to or greater than predetermined power is continued for a second predetermined time, the electronic control unit may be configured to inhibit the intermittent operation of the engine. The predetermined power is power to such an extent that the temperature of the particulate matter filter can be increased to a regeneration possible temperature for a certain time when the power is output from the engine, and for example, power of 40%, 50%, or 60% with respect to maximum power of the engine can be used. The second predetermined time is a time for determining that a state in which the required power is equal to or greater than the predetermined power is continued over a time or more needed for regenerating the particulate matter filter later, and for example, five seconds, 10 seconds, or the like can be used. From this, even when the vehicle speed is lower than the second predetermined vehicle speed, when determination is made that a state in which the required power is equal to or greater than the predetermined power is continued for a time or more needed for regenerating the particulate matter filter later, the intermittent operation of the engine is inhibited. With this, it is possible to increase the temperature of the particulate matter filter to further increase opportunities for regenerating the particulate matter filter compared to a case where such control is not performed.

In the hybrid vehicle, when the electronic control unit estimates that the deposition amount of the particulate matters deposited on the particulate matter filter is equal to or greater than a second deposition amount, the electronic control unit may be configured to operate the engine such that an air-fuel ratio of the engine is repeatedly changed between a rich state and a lean state. The second deposition amount may be smaller than the first deposition amount. With the above-described configuration, the engine is operated such that the air-fuel ratio is repeatedly changed between the rich state and the lean state, whereby it is possible to quickly increase the temperature of the particulate matter filter attached to the exhaust system compared to a case where such control is not performed. As a result, it is possible to increase opportunities for performing the regeneration of the particulate matter filter.

In the hybrid vehicle, when the electronic control unit estimates that the deposition amount of the particulate matters deposited on the particulate matter filter is equal to or greater than the first deposition amount and determines that a temperature of the particulate matter filter is equal to or higher than a predetermined temperature, the electronic control unit may be configured to execute one of control to operate the engine by controlling an air-fuel ratio of the engine to a lean state and control to operate the engine (22) with stopping fuel injection to the engine. The regeneration of the particulate matter filter is performed by supplying air (oxygen) to the particulate matter filter and combusting the particulate matters in a state in which the temperature of the particulate matter filter is increased to the regeneration possible temperature or more. Accordingly, as a method that supplies air (oxygen) to the particulate matter filter, a method that brings the air-fuel ratio of the engine into the lean state and operates the engine, a method that operate the engine without fuel injection to the engine, and the like can be exemplified, and in all methods, it is possible to regenerate the particulate matter filter. The operation of the engine without fuel injection may be an operation in which a crankshaft of the engine is rotated without fuel injection into a combustion chamber of the engine.

A second aspect of the disclosure provides a control method for a hybrid vehicle. The hybrid vehicle includes an engine, a motor, a battery, and an electronic control unit. The engine includes an exhaust system that includes a particulate matter filter. The particulate matter filter is configured to eliminate particulate matters. The motor is configured to output power for traveling of the hybrid vehicle. The battery is configured to exchange electric power with the motor. The control method includes: when the electronic control unit determines that a vehicle speed of the hybrid vehicle is lower than a first predetermined vehicle speed, controlling, by the electronic control unit, the engine and the motor such that an intermittent operation of the engine is permitted and the hybrid vehicle travels with required power; and inhibiting, by the electronic control unit, the intermittent operation of the engine when the electronic control unit estimates that a deposition amount of particulate matters deposited on the particulate matter filter is equal to or greater than a first deposition amount and determines that a state in which the vehicle speed is equal to or higher than a second predetermined vehicle speed and is lower than the first predetermined vehicle speed is continued for a first predetermined time. The second predetermined vehicle speed is lower than the first predetermined vehicle speed.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is a flowchart showing an example of an intermittent operation permission/inhibition processing routine that is executed by an HVECU 70; and FIG. 3 is an explanatory view showing an example of temporal change in a PM deposition amount Qpm, a vehicle speed V, permission or inhibition of an intermittent operation of an engine 22, and the like.

DETAILED DESCRIPTION OF EMBODIMENTS

Figure 1:
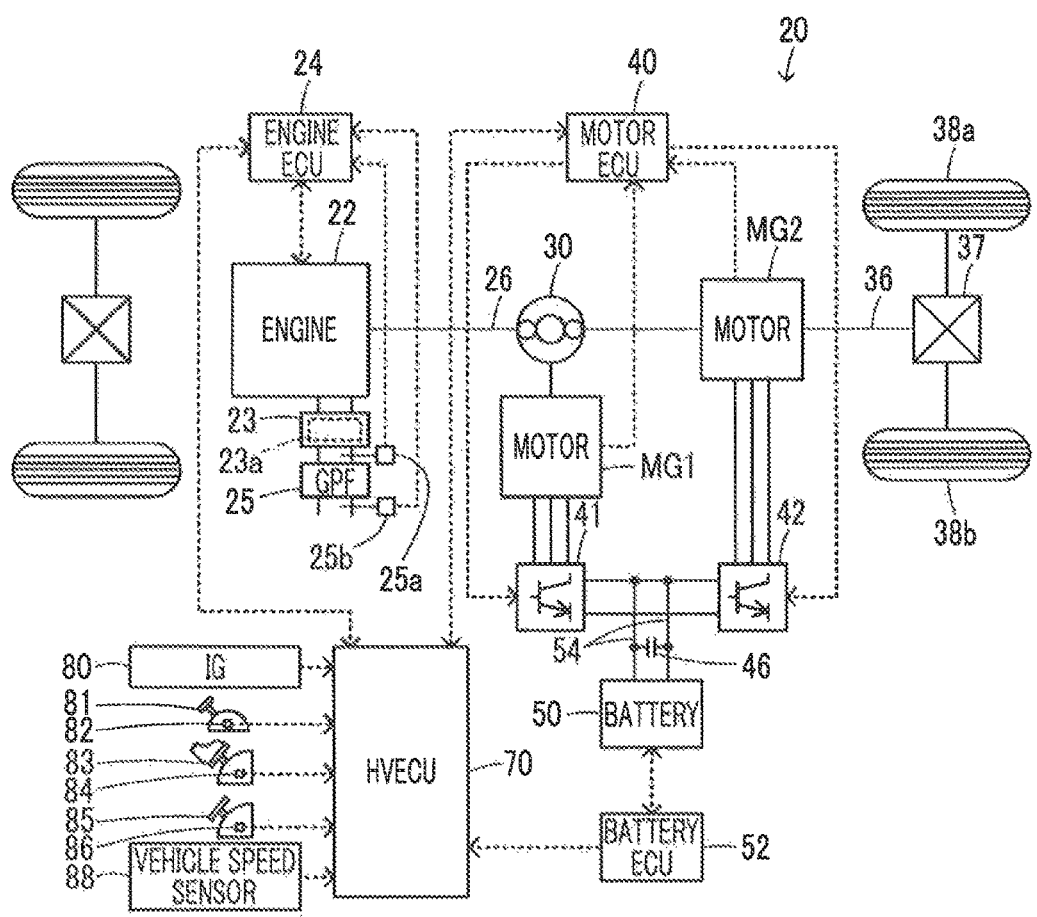
FIG. 1 is a configuration diagram showing the outline of the configuration of a hybrid vehicle 20 as an example of the disclosure.

Next, an embodiment of the disclosure will be described referring to the drawings.

FIG. 1 is a configuration diagram showing the outline of the configuration of a hybrid vehicle 20 as an embodiment of the disclosure. As shown in FIG. 1, the hybrid vehicle 20 of the embodiment includes an engine 22, a planetary gear 30, motors MG1, MG2, inverters 41, 42, a battery 50, an electronic control unit for hybrid (hereinafter, referred to as an HVECU) 70.

The engine 22 is constituted as an internal combustion engine that outputs power with gasoline, diesel, or the like as fuel. The operation of the engine 22 is controlled by an electronic control unit for an engine (hereinafter, referred to as an engine ECU) 24. An exhaust system of the engine 22 is attached with an exhaust gas control apparatus 23 and a particulate matter filter (hereinafter, referred to as a PM filter) 25. The exhaust gas control apparatus 23 is filled with a catalyst 23a that eliminates unburned fuel, nitrogen oxide, or the like in exhaust gas. The PM filter 25 is formed as a porous filter of ceramics, stainless steel, or the like, and traps particulate matters (PM), such as soot.

Though not shown, the engine ECU 24 is constituted as a microprocessor centering on a CPU. The engine ECU 24 includes, in addition to the CPU, a ROM that stores a processing program, a RAM that temporarily stores data, an input/output port, and a communication port. Signals from various sensors needed for controlling the operation of the engine 22 are input to the engine ECU 24 through the input port. As the signals from various sensors, for example, a crank position from a crank position sensor (not shown) that detects a rotation position of the crankshaft 26, a coolant temperature Tw from a coolant temperature sensor (not shown) that detects a temperature of a coolant of the engine 22, and the like can be exemplified. A throttle valve opening degree TH from a throttle valve position sensor (not shown) that detects a position of a throttle valve, an intake air amount Qa from an air flowmeter (not shown) attached to an intake pipe, an intake air temperature Ta from a temperature sensor (not shown) attached to the intake pipe, and the like can also be exemplified. Pressure P1, P2 from pressure sensors 25a, 25b attached upstream and downstream of the PM filter 25 of the exhaust system can also be exemplified. Various control signals for controlling the operation of the engine 22 are output from the engine ECU 24 through the output port. As various control signals, for example, a drive signal to a fuel injection valve, a drive signal to a throttle motor that regulates the position of the throttle valve, a control signal to an ignition coil integrated with an igniter can be exemplified. The engine ECU 24 is connected to the HVECU 70 through the communication port. The engine ECU 24 controls the operation of the engine 22 based on a control signal from the HVECU 70. The engine ECU 24 outputs data relating to an operation state of the engine 22 to the HVECU 70 as needed. The engine ECU 24 calculates a rotation speed of a crankshaft 26, that is, a rotation speed Ne of the engine 22 based on a crank angle $\theta cr$. The engine ECU 24 also calculates volumetric efficiency (a ratio of volume of air actually sucked in one cycle to stroke volume of the engine 22 per cycle) KL based on the intake air amount Qa from the air flowmeter and the rotation speed Ne of the engine 22. The engine ECU 24 calculates the PM deposition amount Qpm as an estimated deposition amount of particulate matters trapped on the PM filter 25 based on a difference pressure $\Delta P$ ($\Delta P=P1-P2$) of the pressure P1, P2 from the pressure sensors 25a, 25b, or calculates a filter temperature Tf as an estimated temperature of the PM filter 25 based on the operation state of the engine 22.

The planetary gear 30 is constituted as a single-pinion type planetary gear mechanism. A rotor of the motor MG1 is connected to a sun gear of the planetary gear 30. A drive shaft 36 coupled to drive wheels 38a, 38b through a differential gear 37 is connected to a ring gear of the planetary gear 30. The crankshaft 26 of the engine 22 is connected to a carrier of the planetary gear 30.

The motor MG1 is constituted as a synchronous motor generator including a rotor embedded with a permanent magnet and a stator wound with three-phase coils, and as described above, the rotor is connected to the sun gear of the planetary gear 30. The motor MG2 is constituted as a synchronous motor generator like the motor MG1, and a rotor is connected to the drive shaft 36. The motors MG1, MG2 are driven by the motor ECU 40 controlling the inverters 41, 42. The inverters 41, 42 are connected to an electric power line 54 connected to the battery 50. Each of the inverters 41, 42 is constituted as an inverter having six transistors and six diodes. Since the inverters 41, 42 share the electric power line 54, it is possible to supply electric power generated by one of the motors MG1, MG2 to the other motor.

Though not shown, the motor ECU 40 is constituted as a microprocessor centering on a CPU. The motor ECU 40 includes, in addition to the CPU, a ROM that stores a processing program, a RAM that temporarily stores data, an input/output port, and a communication port. Signals from various sensors needed for controlling the drive of the motors MG1, MG2 are input to the motor ECU 40 through the input port. As the signals from various sensors, for example, rotation positions $\theta m1$, $\theta m2$ from rotation position detection sensors (not shown) that detect rotation positions of the rotors of the motors MG1, MG2, phase currents from current sensors that detect currents flowing in the phases of the motors MG1, MG2, a voltage VL of a capacitor 46 (electric power line 54) from a voltage sensor (not shown) attached between terminals of the capacitor 46, and the like can be exemplified. A switching control signal to the transistors of the inverters 41, 42 for controlling the drive of the motors MG1, MG2, and the like are output from the motor ECU 40 through the output port. The motor ECU 40 is connected to the HVECU 70 through the communication port. The motor ECU 40 controls the drive of the motors MG1, MG2 according to a control signal from the HVECU 70. The motor ECU 40 outputs data relating to drive states of the motors MG1, MG2 to the HVECU 70 as needed. The motor ECU 40 calculates rotation speeds Nm1, Nm2 of the motors MG1, MG2 based on the rotation positions $\theta m1$, $\theta m2$ of the rotors of the motors MG1, MG2.

The battery 50 is constituted as, for example, a lithium-ion secondary battery or a nickel-hydrogen secondary battery, and exchanges electric power with the motors MG1, MG2 through the inverters 41, 42. The battery 50 is managed by an electronic control unit for a battery (hereinafter, referred to as a battery ECU) 52.

Though not shown, the battery ECU 52 is constituted as a microprocessor centering on a CPU, and includes, in addition to the CPU, a ROM that stores a processing program, a RAM that temporarily stores data, an input/output port, and a communication port. Signals needed for managing the battery 50 are input to the battery ECU 52 through the input port, and data relating to a state of the battery 50 is transmitted to the HVECU 70 through communication as needed. As the signals that are input through the input port, for example, an inter-terminal voltage Vb from a voltage sensor (not shown) provided between terminals of the battery 50, a charging and discharging current Ib from a current sensor (not shown) attached to the electric power line 54 connected to an output terminal of the battery 50, a battery temperature Tb from a temperature sensor (not shown) attached to the battery 50, and the like can be exemplified. The battery ECU 52 calculates a state of charge SOC or input and output limits Win, Wout in order to manage the battery 50. The state of charge SOC is a ratio of capacity of electric power dischargeable from the battery 50 to total capacity, and is calculated based on an integrated value of the charging and discharging current Ib detected by the current sensor. The input and output limits Win, Wout are maximum allowable electric power in charging and discharging the battery 50, and is calculated based on the calculated state of charge SOC and the battery temperature Tb.

Though not shown, the HVECU 70 is constituted as a microprocessor centering on a CPU. The HVECU 70 includes, in addition to the CPU, a ROM that stores a processing program, a RAM that temporarily stores data, an input/output port, and a communication port. Signals from various sensors are input to the HVECU 70 through the input port. As the signals from various sensors, for example, an ignition signal from an ignition switch 80, and a shift position SP from a shift position sensor 82 that detects an operation position of a shift lever 81 can be exemplified. An accelerator operation amount Ace from an accelerator pedal position sensor 84 that detects a depression amount of an accelerator pedal 83, a brake pedal position BP from a brake pedal position sensor 86 that detects a depression amount of a brake pedal 85, a vehicle speed V from a vehicle speed sensor 88, and the like can also be exemplified. As described above, the HVECU 70 is connected to the engine ECU 24, the motor ECU 40, and the battery ECU 52 through the communication port. The HVECU 70 exchanges various control signals or data with the engine ECU 24, the motor ECU 40, and the battery ECU 52.

The hybrid vehicle 20 of the example configured as above travels in a hybrid traveling mode (HV traveling mode) in which traveling is enabled accompanied with the operation of the engine 22 or an electrically powered traveling mode (EV traveling mode) in which traveling is enabled while the operation of the engine 22 is stopped.

At the time of traveling in the HV traveling mode, the HVECU 70 first sets required torque Tr* required for traveling (to be output to the drive shaft 36) based on the accelerator operation amount Acc from the accelerator pedal position sensor 84 and the vehicle speed V from the vehicle speed sensor 88. Subsequently, power for traveling Pdrv* required for traveling is calculated by multiplying the set required torque Tr* by a rotation speed Nr of the drive shaft 36. As the rotation speed Nr of the drive shaft 36, a rotation speed that is obtained by multiplying the rotation speed Nm2 of the motor MG2 or the vehicle speed V by a conversion coefficient can be used. Then, required power Pe* required for the vehicle is set by subtracting required charging and discharging power Pb* (a positive value when electric power is discharged from the battery 50) of the battery 50 from the calculated power for traveling Pdrv*. The required charging and discharging power Pb* is set based on the difference ΔSOC between the state of charge SOC and a target state of charge SOC* of the battery 50 such that an absolute value of the difference ΔSOC becomes small. Next, a target rotation speed Ne* or target torque Te* of the engine 22 and torque commands Tm1*, Tm2* of the motors MG1, MG2 are set such that the required power Pe* is output from the engine 22 and the required torque Tr* is output to the drive shaft 36. The target rotation speed Ne* and the target torque Te* of the engine 22 are transmitted to the engine ECU 24. The torque commands Tm1*, Tm2* of the motors MG1, MG2 are transmitted to the motor ECU 40. The engine ECU 24 performs intake air amount control, fuel injection control, ignition control, and the like of the engine 22 such that the engine 22 is operated based on the target rotation speed Ne* and the target torque Te*. The motor ECU 40 performs switching control of the transistors of the inverters 41, 42 such that the motors MG1, MG2 are driven with the torque commands Tm1*, Tm2*.

At the time of traveling in the EV traveling mode, the HVECU 70 first sets the required torque Tr* based on the accelerator operation amount Acc from the accelerator pedal position sensor 84 and the vehicle speed V from the vehicle speed sensor 88, and calculates the power for traveling Pdrv* by multiplying the required torque Tr* by the rotation speed Nr of the drive shaft 36. Subsequently, a value of 0 is set as the torque command Tm1* of the motor MG1, and the torque command Tm2* of the motor MG2 is set such that required torque Tr* (power for traveling Pdrv*) is output to the drive shaft 36. The torque commands Tm1*, Tm2* of the motors MG1, MG2 are transmitted to the motor ECU 40. As described above, the motor ECU 40 controls the inverters 41, 42.

Next, an operation of the hybrid vehicle 20 of the example configured as above, in particular, an operation in a case of promoting regeneration of the PM filter 25 on which the particulate matters are deposited will be described. The regeneration of the PM filter 25 is performed by operating the engine 22 with a comparatively high load to increase the temperature of the PM filter 25 to be equal to or higher than a regeneration possible temperature (for example, 600° C. or the like), in this state, operating the engine 22 with an air-fuel ratio in a lean state (a state in which the amount of fuel is smaller than that of a stoichiometric air-fuel ratio) or operating the engine 22 in a state in which fuel injection is stopped, supplying air (oxygen) to the PM filter 25, and combusting the particulate matters deposited on the PM filter 25. In the embodiment, when the PM deposition amount Qpm of the PM filter 25 becomes comparatively large and reaches equal to or higher than a threshold Qref2 at which the regeneration of the PM filter 25 is needed to a certain extent, when the engine 22 is operated with a comparatively high load such that the temperature of the PM filter 25 is equal to or higher than the regeneration possible temperature, control (in the embodiment, referred to as "dither control") for operating the engine 22 by performing fuel injection such that the air-fuel ratio is repeatedly changed between a rich state (a state in which the amount of fuel is greater than that of the stoichiometric air-fuel ratio) and the lean state.

In the hybrid vehicle 20 of the embodiment, an intermittent operation permission/inhibition processing routine illustrated in FIG. 2 is executed in order to increase opportunities for regenerating the PM filter 25 on which the particulate matters are deposited. The intermittent operation permission/inhibition means permission or inhibition of the intermittent operation of the engine 22. The routine is repeatedly executed by the HVECU 70 at every predetermined time (for example, every tens of msec or every hundreds of msec).

In a case where the intermittent operation permission/inhibition processing routine is executed, the HVECU 70 first executes processing for inputting data needed for determining the permission or inhibition of the intermittent operation of the engine 22, such as the PM deposition amount Qpm, the power for traveling Pdrv*, the vehicle speed V from the vehicle speed sensor 88 (Step S100). In the embodiment, for the PM deposition amount Qpm, a value estimated based on the difference pressure ΔP (ΔP=P1−P2) between the pressure P1, P2 from the pressure sensors 25a, 25b is input from the engine ECU 24 through communication. For the power for traveling Pdrv*, a value calculated by multiplying the required torque Tr* set based on the accelerator operation amount Acc from the accelerator pedal position sensor 84 and the vehicle speed V from the vehicle speed sensor 88 by the rotation speed Nr of the drive shaft 36 is input in drive control in the EV traveling mode and the HV traveling mode.

In a case where data is input in this manner, determination is made whether or not the input PM deposition amount Qpm is equal to or greater than a threshold Qref1 (Step S110). The threshold Qref1 is a PM deposition amount in which determination is made that the regeneration of the PM filter 25 is needed. The above-described threshold Qref2 is a value smaller than the threshold Qref1. When the PM deposition amount Qpm is less than the threshold Qref1, determination is made that the regeneration of the PM filter 25 is not needed, normal control is performed as the permission or inhibition of the intermittent operation of the engine 22 (Step S160), and the routine ends. As the normal control, in the embodiment, control for, in a state in which a precondition that the state of charge SOC of the battery 50 is equal to or greater than a threshold is established, when the vehicle speed V is lower than a threshold Vref1, permitting the intermittent operation of the engine 22, and when the vehicle speed V is equal to or higher than the threshold Vref1, inhibiting the intermittent operation of the engine 22 (continuing the operation of the engine 22) is used. As the threshold Vref1, for example, 110 km/h, 120 km/h, 130 km/h, or the like can be used.

When the PM deposition amount Qpm is equal to or greater than the threshold Qref1, determination is made that the regeneration of the PM filter 25 is needed, and determination is made whether or not the vehicle speed V is equal to or higher than a threshold Vref2 and is lower than the threshold Vref1 (Step S120). The threshold Vref2 is a value that is smaller than the threshold Vref1 for determining the permission or inhibition of the intermittent operation in the normal control, and for example, a value smaller than the threshold Vref1 by about 15 km/h to 30 km/h can be used. Accordingly, in Step S120, a state is determined in which the intermittent operation of the engine 22 is permitted in the normal control, but traveling is performed at a comparatively high vehicle speed. When determination is made that the vehicle speed V is equal to or higher than the threshold Vref2 and is lower than the threshold Vref1, determination is made whether or not a state in which the vehicle speed V is equal to or higher than the threshold Vref2 and is lower than the threshold Vref1 is continued for a first predetermined time (Step S130). The first predetermined time is a time for determining that a state in which the vehicle speed V is equal to or higher than the threshold Vref2 for permitting the intermittent operation of the engine 22 is continued over a time or more needed for regenerating the PM filter 25 later, and for example, five seconds, 10 seconds, or the like can be used. When determination is made that a state in which the vehicle speed V is equal to or greater than the threshold Vref2 and is lower than the threshold Vref1 is not continued for the first predetermined time, the normal control is performed as the permission or inhibition of the intermittent operation of the engine 22 (Step S160), and the routine ends. When determination is made that a state in which the vehicle speed V is equal to or higher than the threshold Vref2 and is lower than the threshold Vref1 is continued for the first predetermined time, the intermittent operation of the engine 22 is inhibited (the operation of the engine 22 is continued) (Step S170), and the routine ends. In a case where the intermittent operation of the engine 22 is inhibited, the operation of the engine 22 is continued, and when the engine 22 is operated with a comparatively high load, the dither control for increasing the temperature of the PM filter 25 is performed. For this reason, it is possible to increase the temperature of the PM filter 25 to reach the regeneration possible temperature at which the regeneration of the PM filter 25 can be performed, and to perform the regeneration of the PM filter 25.

In Step S120, when determination is made that the vehicle speed V is equal to or higher than the threshold Vref1, the normal control is performed as the permission or inhibition of the intermittent operation of the engine 22 (Step S160), and the routine ends. In this case, since the intermittent operation of the engine 22 is inhibited even in the normal control, it is possible to increase the temperature of the PM filter 25 accompanied with the dither control (or without the dither control) to reach the regeneration possible temperature at which the regeneration of the PM filter 25 can be performed, and to perform the regeneration of the PM filter 25.

In Step S120, when determination is made that the vehicle speed V is lower than the threshold Vref2, determination is made whether or not the power for traveling Pdrv* is equal to or greater than a threshold Pref (Step S140). The threshold Pref is power to such an extent that the temperature of the PM filter 25 can be increased to the regeneration possible temperature for a certain time when the power is output from the engine 22 accompanied with the dither control (or without the dither control), and for example, power of 40%, 50%, or 60% with respect to maximum power of the engine 22 can be used. Accordingly, in Step S140, determination is made that power is output to such an extent that the temperature of the PM filter 25 can be increased to the regeneration possible temperature even if the vehicle speed V is lower than the threshold Vref2. When determination is made that the power for traveling Pdrv* is less than the threshold Pref, determination is made that the regeneration of the PM filter 25 cannot be performed, the normal control is performed as the permission or inhibition of the intermittent operation of the engine 22 (Step S160), and the routine ends. When determination is made that the power for traveling Pdrv* is equal to or greater than the threshold Pref, determination is made whether or not a state in which the power for traveling Pdrv* is equal to or greater than the threshold Pref is continued for a second predetermined time (Step S150). The second predetermined time is a time for determining that a state in which the power for traveling Pdrv* is equal to or greater than the threshold Pref is continued over a time or more needed for regenerating the PM filter 25 later, and for example, five seconds, 10 seconds, or the like can be used. When determination is made that a state in which the power for traveling Pdrv* is equal to or greater than the threshold Pref is not continued for the second predetermined time, the normal control is performed as the permission or inhibition of the intermittent operation of the engine 22 (Step S160), and the routine ends. When determination is made that a state in which the power for traveling Pdrv* is equal to or greater than the threshold Pref is continued for the second predetermined time, the intermittent operation of the engine 22 is inhibited (the operation of the engine 22 is continued) (Step S170), and the routine ends. In a case where the intermittent operation of the engine 22 is inhibited, the operation of the engine 22 is continued, and when the engine 22 is operated with a comparatively high load, the dither control for increasing the temperature of the PM filter 25 is performed. For this reason, it is possible to increase the temperature of the PM filter 25 to reach the regeneration possible temperature at which the regeneration of the PM filter 25 can be performed, and to perform the regeneration of the PM filter 25.

FIG. 3 is an explanatory view showing an example of temporal change in the PM deposition amount Qpm, the vehicle speed V, the permission or inhibition of the intermittent operation of the engine 22, and the like of the embodiment. FIG. 3 shows, in order from above, the PM deposition amount Qpm, the vehicle speed V, the rotation speed Ne of the engine 22, excitation amplitude in the dither control, the permission or inhibition of the intermittent operation of the engine 22, the fuel injection amount, and the temperature (filter temperature) Tf of the PM filter 25. The excitation amplitude in the dither control means amplitude between the rich state and the lean state as the air-fuel ratio, a "value of 0" indicates that the dither control is not performed, "small" indicates that the degree of rich state or the degree of lean state is small, and "large" indicates that the degree of rich state or the degree of lean state is large. FIG. 3 schematically shows the fuel injection amount, a wave line with small amplitude indicates that the dither control when the excitation amplitude is "small" is being executed, a wave line with large amplitude indicates that the dither control when the excitation amplitude is "large" is being executed, and a slight low value indicates that the air-fuel ratio is in the lean state. At time T1, in a case where the PM deposition amount Qpm becomes equal to or greater than the threshold Qref2, when the engine 22 is operated with a comparatively high load later, the dither control is executed. In the embodiment, when the PM deposition amount Qpm is equal to or greater than the threshold Qref2 and is less than the threshold Qref1, the dither control with the excitation amplitude of "small" is performed, and when the PM deposition amount Qpm is equal to or greater than the threshold Qref1, the dither control with the excitation amplitude of "large" is performed. At time T2, the PM deposition amount Qpm becomes equal to or greater than the threshold Qref1, thereafter, at time T3, the vehicle speed V reaches equal to or higher than the threshold Vref2, and at time T4 when a state in which the vehicle speed V is equal to or higher than the threshold Vref2 and is lower than the threshold Vref1 is continued for a predetermined time from time T3, the intermittent operation of the engine 22 is inhibited. Thereafter, when the temperature (filter temperature) Tf of the PM filter 25 is lower than the regeneration possible temperature, the dither control is executed, and when the temperature (filter temperature) Tf of the PM filter 25 is equal to or higher than the regeneration possible temperature, control for operating the engine 22 with the air-fuel ratio in the lean state is executed instead of the dither control. In a case where the engine 22 is operated with the air-fuel ratio in the lean state in a state in which the temperature (filter temperature) Tf of the PM filter 25 is equal to or higher than the regeneration possible temperature, air (oxygen) is supplied to the PM filter 25, the particulate matters deposited on the PM filter 25 are combusted, and the PM deposition amount Qpm decreases. Then, at time T5 when the PM deposition amount Qpm reaches a value at which determination can be made that the regeneration of the PM filter 25 is completed, the regeneration of the PM filter 25 is completed, and the intermittent operation of the engine 22 is permitted.

In the hybrid vehicle 20 of the embodiment described above, when the PM deposition amount Qpm that is estimated as the deposition amount of the particulate matters trapped on the PM filter 25 is equal to or greater than the threshold Qref1 for determining that the regeneration of the PM filter 25 is needed and a state in which the vehicle speed V is equal to or higher than the threshold Vref2 and is lower than the threshold Vref1 for determining the permission or inhibition of the intermittent operation of the engine 22 is continued for the first predetermined time, the intermittent operation of the engine 22 is inhibited. In a case where the intermittent operation of the engine 22 is inhibited, since the operation of the engine 22 is continued, it is possible to increase the temperature of the PM filter 25 to reach the regeneration possible temperature at which the regeneration of the PM filter 25 can be performed, and to perform the regeneration of the PM filter 25. With this, compared to a case where the intermittent operation of the engine 22 is not inhibited even when a state in which the vehicle speed V is equal to or higher than the threshold Vref2 and is lower than the threshold Vref1 for determining the permission or inhibition of the intermittent operation of the engine 22 is continued for the first predetermined time, it is possible to increase opportunities for performing the regeneration of the PM filter 25. In addition, since the dither control for repeatedly changing the air-fuel ratio between the rich state and the lean state is performed when the engine 22 is operated with a comparatively high load, it is possible to make the temperature of the PM filter 25 quickly reach the regeneration possible temperature, and to perform the regeneration of the PM filter 25.

In the hybrid vehicle 20 of the embodiment, when the PM deposition amount Qpm is equal to or greater than the threshold Qref1, and when a state in which the power for traveling Pdrv* required for traveling is equal to or greater than the threshold Pref is continued for the second predetermined time even if the vehicle speed V is lower than the threshold Vref2, the intermittent operation of the engine 22 is inhibited. Since the threshold Pref is power to such an extent that the temperature of the PM filter 25 can be increased to the regeneration possible temperature, the operation of the engine 22 is continued, whereby it is possible to make the temperature of the PM filter 25 reach the regeneration possible temperature, and to perform the regeneration of the PM filter 25. As a result, it is possible to increase opportunities for performing the regeneration of the PM filter 25 compared to a case where such control is not performed. Of course, when the engine 22 is operated with a comparatively high load, since the dither control for repeatedly changing the air-fuel ratio between the rich state and the lean state is performed, it is possible to make the temperature of the PM filter 25 quickly reach the regeneration possible temperature, and to perform the regeneration of the PM filter 25.

In the hybrid vehicle 20 of the embodiment, when the PM deposition amount Qpm is equal to or greater than the threshold Qref2 and is less than the threshold Qref1, the dither control with the excitation amplitude of "small" is performed, and when the PM deposition amount Qpm is equal to or greater than the threshold Qref1, the dither control with the excitation amplitude of "large" is performed. However, when the PM deposition amount Qpm is equal to or greater than the threshold Qref2, the dither control with the excitation amplitude of "large" may be constantly performed. The dither control may be executed exclusively when the PM deposition amount Qpm is equal to or greater than the threshold Qref1. Alternatively, such dither control may not be performed.

In the hybrid vehicle 20 of the embodiment, when the PM deposition amount Qpm is equal to or greater than the threshold Qref1, and when a state in which the power for traveling Pdrv* is equal to or greater than the threshold Pref is continued for the second predetermined time even if the vehicle speed V is lower than the threshold Vref2, the intermittent operation of the engine 22 is inhibited. However, when the PM deposition amount Qpm is equal to or greater than the threshold Qref1, and when the vehicle speed V is lower than the threshold Vref2, the normal control may be performed as the permission or inhibition of the intermittent operation of the engine 22 regardless of the magnitude of the power for traveling Pdrv*.

In the embodiment, although the disclosure is applied to the hybrid vehicle 20 in which the engine 22 and the two motors MG1, MG2 are connected to the planetary gear 30, the disclosure may be applied to a hybrid vehicle having any configuration as long as a hybrid vehicle includes an engine and a motor that outputs power for traveling.

In the above-described embodiment, the PM filter 25 is an example of a "particulate matter filter". The engine 22 is an example of an "engine". The motor MG2 is an example of a "motor". The battery 50 is an example of a "battery". The HVECU 70, the engine ECU 24, the motor ECU 40, and the battery ECU 52 are an example of an "electronic control unit".

Although the mode for carrying out the disclosure has been described above in connection with the example, the disclosure is not limited to the example, and can be of course carried out in various forms without departing from the spirit and scope of the disclosure.

The disclosure is usable in a manufacturing industry of a hybrid vehicle.

What is claimed is:

1. A hybrid vehicle comprising:
an engine including an exhaust system that includes a particulate matter filter, the particulate matter filter being configured to eliminate particulate matters;
a motor configured to output power for traveling of the hybrid vehicle;
a battery configured to exchange electric power with the motor; and
an electronic control unit configured to, when the electronic control unit determines that a vehicle speed of the hybrid vehicle is lower than a first predetermined vehicle speed, control the engine and the motor such that an intermittent operation of the engine is permitted and the hybrid vehicle travels with required power,
the electronic control unit being configured to inhibit the intermittent operation of the engine when the electronic control unit estimates that a deposition amount of particulate matters deposited on the particulate matter filter is equal to or greater than a first deposition amount, and determines that a state in which the vehicle speed is equal to or higher than a second predetermined vehicle speed and is lower than the first predetermined vehicle speed is continued for a first predetermined time, the second predetermined vehicle speed being lower than the first predetermined vehicle speed.

2. The hybrid vehicle according to claim 1, wherein
when the electronic control unit estimates that the deposition amount of the particulate matters deposited on the particulate matter filter is equal to or greater than the first deposition amount, and determines that a state in which the vehicle speed is lower than the second predetermined vehicle speed and the required power is equal to or greater than predetermined power is continued for a second predetermined time, the electronic control unit is configured to inhibit the intermittent operation of the engine.

3. The hybrid vehicle according to claim 1, wherein
when the electronic control unit estimates that the deposition amount of the particulate matters deposited on the particulate matter filter is equal to or greater than a second deposition amount, the electronic control unit is configured to operate the engine such that an air-fuel ratio of the engine is repeatedly changed between a rich state and a lean state, and
the second deposition amount is smaller than the first deposition amount.

4. The hybrid vehicle according to claim 1, wherein
when the electronic control unit estimates that the deposition amount of the particulate matters deposited on the particulate matter filter is equal to or greater than the first deposition amount, and determines that a temperature of the particulate matter filter is equal to or higher than a predetermined temperature, the electronic control unit is configured to execute one of control to operate the engine by controlling an air-fuel ratio of the engine to a lean state and control to operate the engine with stopping fuel injection to the engine.

5. A control method for a hybrid vehicle,
the hybrid vehicle including an engine, a motor, a battery, and an electronic control unit,
the engine including an exhaust system that includes a particulate matter filter, the particulate matter filter being configured to eliminate particulate matters,
the motor being configured to output power for traveling of the hybrid vehicle, and
the battery being configured to exchange electric power with the motor,
the control method comprising:
when the electronic control unit determines that a vehicle speed of the hybrid vehicle is lower than a first predetermined vehicle speed, controlling, by the electronic control unit, the engine and the motor such that an intermittent operation of the engine is permitted and the hybrid vehicle travels with required power; and
inhibiting, by the electronic control unit, the intermittent operation of the engine when the electronic control unit estimates that a deposition amount of particulate matters deposited on the particulate matter filter is equal to or greater than a first deposition amount and determines that a state in which the vehicle speed is equal to or higher than a second predetermined vehicle speed and is lower than the first predetermined vehicle speed is continued for a first predetermined time, the second predetermined vehicle speed being lower than the first predetermined vehicle speed.

* * * * *